United States Patent
Jonas

(10) Patent No.: US 11,385,630 B2
(45) Date of Patent: Jul. 12, 2022

(54) PRODUCTION AND MEASUREMENT OF WORKPIECES

(71) Applicant: RENISHAW PLC, Wotton-under-Edge (GB)

(72) Inventor: Kevyn Barry Jonas, Clevedon (GB)

(73) Assignee: RENISHAW PLC, Wotton-under-Edge (GB)

( * ) Notice: Subject to any disclaimer, the term of this patent is extended or adjusted under 35 U.S.C. 154(b) by 227 days.

(21) Appl. No.: 16/768,756

(22) PCT Filed: Dec. 12, 2018

(86) PCT No.: PCT/GB2018/053605
§ 371 (c)(1),
(2) Date: Jun. 1, 2020

(87) PCT Pub. No.: WO2019/122821
PCT Pub. Date: Jun. 27, 2019

(65) Prior Publication Data
US 2021/0116897 A1    Apr. 22, 2021

(30) Foreign Application Priority Data
Dec. 19, 2017 (GB) ...................... 1721309

(51) Int. Cl.
*G05B 19/418* (2006.01)
*G01B 21/00* (2006.01)

(52) U.S. Cl.
CPC ....... *G05B 19/41875* (2013.01); *G01B 21/00* (2013.01); *G05B 2219/32182* (2013.01); *G05B 2219/37576* (2013.01)

(58) Field of Classification Search
CPC .... G05B 19/41875; G05B 2219/32182; G05B 2219/37576; G01B 21/00; Y02P 90/02
See application file for complete search history.

(56) References Cited

U.S. PATENT DOCUMENTS

| 5,189,624 A | 2/1993 | Barlow et al. |
| 5,339,249 A | 8/1994 | Schaeffer |

(Continued)

FOREIGN PATENT DOCUMENTS

| CN | 1142423 A | 2/1997 |
| CN | 1286157 A | 3/2001 |

(Continued)

OTHER PUBLICATIONS

Mar. 7, 2019 International Search Report issued in International Patent Application No. PCT/GB2018/053605.

(Continued)

*Primary Examiner* — Ramesh B Patel
(74) *Attorney, Agent, or Firm* — Oliff PLC

(57) ABSTRACT

A method of producing a workpiece which is successively loaded onto two or more machine tools and one or more machining operations are performed to produce one or more features of the workpiece on each machine tool. After the machining operations on both or all of the machine tools, the workpiece is passed to a common dimensional inspection station. At the common dimensional inspection station, dimensions of the features of the workpiece produced by the machining operations on the two or more machine tools are measured. Based on the results of measuring the dimensions of the features, two or more output signals are produced which respectively relate to the performance of the two or more machine tools which performed the machining operations. Each of the output signals is fed back to the machine tool which performed the respective operation, to adjust the production process of each corresponding machine tool.

11 Claims, 4 Drawing Sheets

(56) References Cited

U.S. PATENT DOCUMENTS

| | | | |
|---|---|---|---|
| 6,304,999 B1* | 10/2001 | Toprac | G05B 19/41865 700/121 |
| 6,400,998 B1 | 6/2002 | Yamazaki et al. | |
| 6,412,329 B1 | 7/2002 | Nai | |
| 6,571,145 B1 | 5/2003 | Matsumiya et al. | |
| 7,013,544 B2* | 3/2006 | Yasuda | B23Q 7/1431 82/122 |
| 8,712,577 B2* | 4/2014 | Gu | G05B 19/401 700/192 |
| 9,961,783 B2* | 5/2018 | Vronsky | H05K 3/4644 |
| 9,989,347 B2* | 6/2018 | Jonas | G01B 5/008 |
| 11,009,856 B2* | 5/2021 | Kiefer | B26D 5/007 |
| 2002/0133268 A1* | 9/2002 | Kato | G05B 19/401 700/98 |
| 2003/0040830 A1 | 2/2003 | Parikh et al. | |
| 2005/0246055 A1 | 11/2005 | Reyes et al. | |
| 2008/0154420 A1 | 6/2008 | Brodsky et al. | |
| 2012/0029856 A1 | 2/2012 | Cohen et al. | |
| 2016/0167184 A1* | 6/2016 | Burkhardt | B23Q 1/625 409/172 |
| 2016/0202691 A1* | 7/2016 | Pettersson | G05B 19/41865 700/98 |
| 2018/0160550 A1* | 6/2018 | Vronsky | B41J 29/393 |
| 2019/0243343 A1* | 8/2019 | Kiefer | B23Q 7/12 |
| 2021/0346988 A1* | 11/2021 | Shibazaki | B22F 10/20 |

FOREIGN PATENT DOCUMENTS

| | | |
|---|---|---|
| CN | 1630840 A | 6/2005 |
| CN | 1214895 C | 8/2005 |
| CN | 102411337 A | 4/2012 |
| CN | 102649246 A | 8/2012 |
| CN | 102999010 A | 3/2013 |
| CN | 105353723 A | 2/2016 |
| CN | 105785943 A | 7/2016 |
| CN | 206039266 U | 3/2017 |
| CN | 106695451 A | 5/2017 |
| EP | 1783454 A1 | 5/2007 |
| WO | 2010/066375 A1 | 6/2010 |
| WO | 2013/021157 A1 | 2/2013 |
| WO | 2018/220373 A1 | 12/2018 |

OTHER PUBLICATIONS

Mar. 7, 2019 Written Opinion issued in International Patent Application No. PCT/GB2018/053605.

Jun. 20, 2018 Search Report issued in British Patent Application No. 1721309.1.

"New Intelligent Process Control Software for Renishaw's EquatorTM Gauging System". Apr. 14, 2017, <URL:http://www.renishaw.com/en/new-intelligent-process-control-software-for-renishaws-equator-gauging-system-41132>.

* cited by examiner

PRODUCTION AND MEASUREMENT OF WORKPIECES

FIELD OF THE INVENTION

This invention relates to the production and measurement of workpieces or parts, and also to methods and manufacturing systems for such production and measurement. The terms "workpiece" and "part" are used interchangeably in this specification.

DESCRIPTION OF PRIOR ART

An automated factory manufacturing system may comprise one or more production machines (such as machine tools) for producing workpieces. Typically these may be produced as a series of nominally identical workpieces. The manufacturing system may also comprise one or more inspection stations for inspecting the workpieces produced. An inspection station may comprise conventional gauging such as fixture gauges, or even manual gauges such as height gauges or calipers. Or it may comprise a coordinate measuring machine (CMM) for measuring the workpieces, or a comparative gauging machine for comparing them with a master reference. These production and inspection machines may each have a numerical control or computer control, linked by a network to one or more server computers. An example is seen in U.S. Pat. No. 5,189,624 (Barlow et al).

A proportion of workpieces produced on a production machine (or even all workpieces produced) may be inspected at an inspection station. A server may schedule workpieces which are to be transferred to an inspection station, and may control transfer robots or conveyors for this purpose.

In some prior art examples, the inspection results may simply be a pass or fail decision. In the case of fail decision (a rejection), this can be fed back to allow adjustment of the production machine, so as to control and improve the subsequent production process. Such control of the production process is performed manually in the example of U.S. Pat. No. 5,189,624. Alternatively, even in the case of a pass decision, if a dimension of a single workpiece has exceeded a control limit, an automatic feedback may be provided to adjust the production machine, e.g. to update a cutting tool offset by an appropriate percentage of the error in the dimension. In this case the control limit may be set at a lower level than the tolerance limit at which workpieces would be rejected. Alternatively, the control limit could be set at the level at which workpieces are rejected.

It is known to perform more sophisticated analysis of the inspection results of multiple workpieces in the series of nominally identical workpieces. For example, a series of measurements of a particular dimension on successive workpieces may be filtered to remove outliers. Alternatively, the series of measurements may be analysed to detect a trend. For example, if the production machine is a machine tool with a cutting tool which wears in use, or which is subject to thermal drift, there may be a gradual trend in which the dimension of a feature of the produced workpieces increases or decreases over time. Such analyses may be performed after inspecting workpieces in a quality control room or laboratory, separate from the production machines. Manual correction of the production process may subsequently be applied by a skilled machine operator, but will not have a beneficial effect on workpieces which have been produced in the meantime.

US Patent Application Publication No. 2003/0040830 (Parikh et al/Applied Materials) shows a multi-step semiconductor processing system. An individual feature of a workpiece is successively processed by independently operating processing tools, each of which performs a different type of manufacturing operation on the feature concerned. Between each manufacturing operation or after all manufacturing operations, the workpiece is removed and placed in metrology station(s), where it is measured to identify whether features of the workpiece are within certain parameters. A metrology data analyser can use the data collected to feed forward or feedback control signals to adjust the processing tools.

US Patent Application Publication No. 2003/0040830 (Cameron/Rolls-Royce) shows a machining cell with multiple processing tools which can perform operations on a workpiece. The cell also includes measuring equipment for measuring the workpiece after an operation has been carried out.

U.S. Pat. No. 6,571,145 (Matsumiya et al/Mitutoyo) shows a manufacturing system with multiple machine tools. The machine tools process identical parts of workpieces. A measuring device measures the workpieces produced by each machine tool, producing a correction data file for the machine tool concerned, containing correction values for multiple dimensions of the workpiece. The correction data file is fed back to adjust the machine tool.

The present applicant's unpublished UK Patent Application No. GB 1708730.5 describes a manufacturing system with multiple machine tools and multiple inspection stations. A workpiece produced by one of the machine tools may be measured at any of the inspection stations, and the result is fed back to adjust the machine tool concerned.

It can be efficient to arrange a manufacturing system such that multiple machine tools successively perform machining operations on an individual workpiece, so as to balance the workload between the machine tools, and so as to machine different workpiece features which cannot easily be machined on a single machine tool with the same set-up. However, measuring the different individual features after each machining operation on successive machine tools reduces the overall efficiency.

SUMMARY OF THE INVENTION

The present invention provides a method of producing a workpiece, comprising:
  successively loading the workpiece onto two or more machine tools and performing one or more machining operations to produce one or more features of the workpiece on each machine tool;
  after the machining operations on both or all of the machine tools, passing the workpiece to a common dimensional inspection station;
  at the common dimensional inspection station, measuring dimensions of the features of the workpiece produced by the machining operations on the two or more machine tools;
  based on the results of measuring the dimensions of the features, producing two or more output signals which respectively relate to the performance of the two or more machine tools which performed the machining operations; and
  feeding each of the output signals back to the machine tool which performed the respective operation, to adjust the production process of each corresponding machine tool.

At least in preferred embodiments of the invention, measuring the features at a common dimensional inspection station, after the machining operations on both or all machine tools, can improve the overall cost effectiveness and efficiency of the manufacturing system. In addition to certifying that the final part has been manufactured within its design specification (quality assurance), the common inspection station may improve quality control by feeding back output signals which respectively relate to the machine tools concerned. This may then enable appropriate corrections to be made to the machining processes without intermediate inspection stations between the machine tools, or with fewer intermediate inspection stations.

Preferably the workpiece is one of a plurality of nominally similar workpieces, on each of which the machining operations are successively performed using the two or more respective machine tools, and each of which is measured at a common inspection station. The method may include analysing the results of the measurements of corresponding features of the workpieces and, based on the analysis, producing said output signals which respectively relate to the performance of the two or more machine tools and which are fed back thereto. The analysis of the results may include detecting a trend in the measurements of successive workpieces.

An output signal which is fed back to a machine tool may update a tool offset value and/or a position at which a feature is machined and/or a workpiece coordinate system. This may correct production of future workpieces.

In one preferred embodiment, the method includes calculating a second one of the output signals in dependence on a first one of the output signals, prior to feeding the second output signal back to the corresponding machine tool. The first output signal may result from measuring a datum feature of the workpiece, and the machine tool to which the second output signal is fed back may perform an operation relative to that datum feature.

A machine tool in the context of the present application is to be understood as being a type of production machine, so that a reference to multiple machine tools herein is a reference to multiple production machines (each of which is a machine tool) rather than a reference to multiple tools (e.g. different types of cutting tool) that might be used within a single production machine.

The present invention also provides a manufacturing system comprising two or more machine tools, at least one dimensional inspection station, and a server and/or a controller or controllers, the server and/or the controller or controllers being configured to control the machine tools and inspection station to perform any of the above methods.

The invention further provides a software program or programs which when run on a server and/or a controller or controllers of such a manufacturing system causes the manufacturing system to perform any of the above methods. Software programs comprising computer code may be recorded on non-transitory machine-readable media such as discs or memory devices, or stored on a remote server for downloading.

BRIEF DESCRIPTION OF THE DRAWINGS

Preferred embodiments of the invention will now be described by way of example, with reference to the accompanying drawings, wherein.

DESCRIPTION OF PREFERRED EMBODIMENTS

Figure 1:
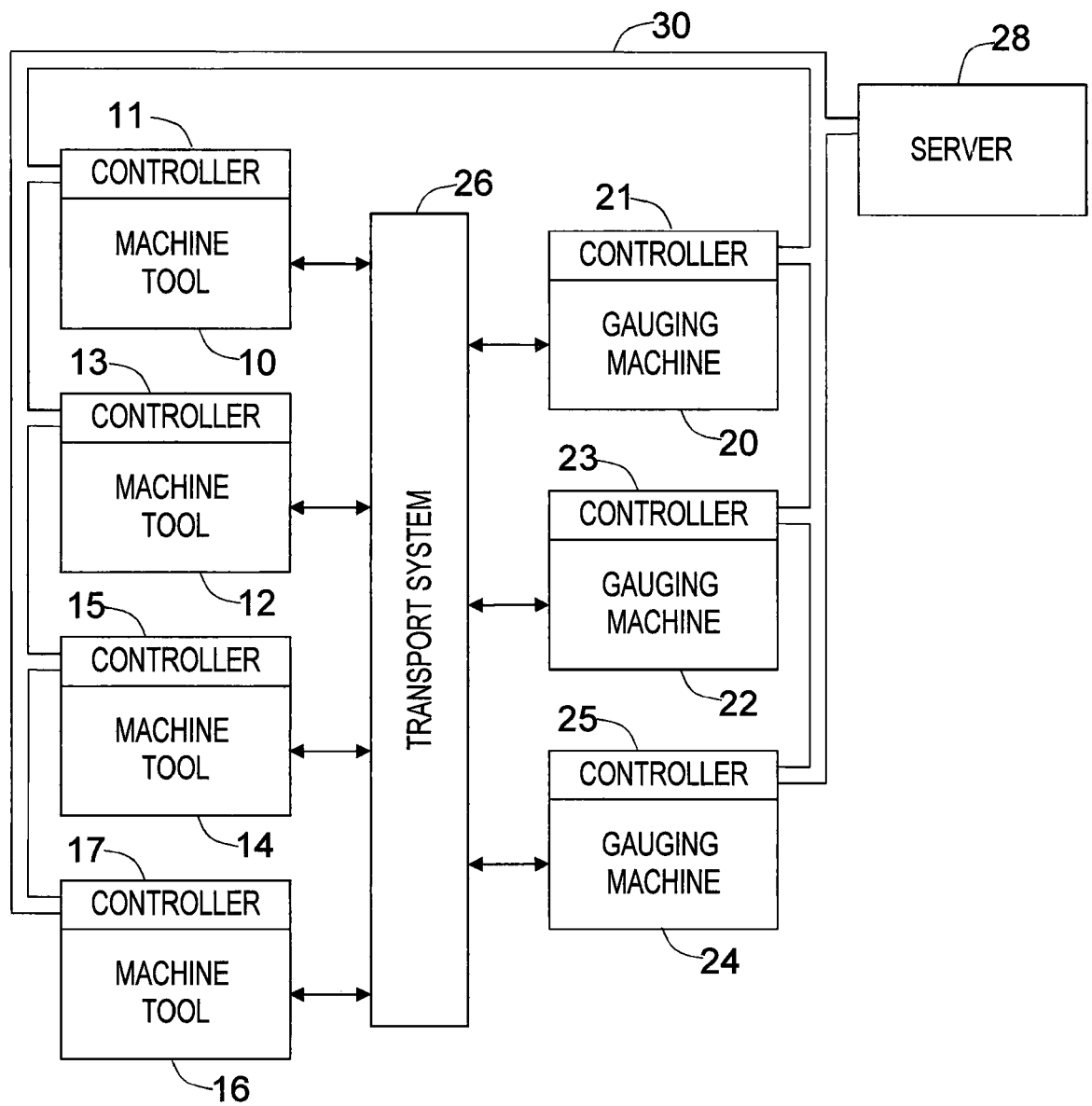
FIG. 1 is a schematic diagram of a manufacturing system arrangement in a factory, including production machines and inspection machines.

The manufacturing arrangement of FIG. 1 includes a number of production stations, each comprising a computer numerically controlled (CNC) production machine 10, 12, 14, 16 for producing parts (workpieces). The production machines may use any manufacturing technology. They may be machine tools such as milling machines, lathes, mill-turning centres, machines for grinding, drilling, laser cutting, lapping, honing, polishing, etc. Or they may be coating machines, forges, presses, or additive manufacturing machines (3D printing). The exact number of these machines is unimportant; there may be two or more. Any combination of different types of production machine may be present, or they may all be identical.

Each production machine is controlled by a respective controller 11, 13, 15, 17 which may comprise a conventional CNC control. Optionally, any or all of the controllers may include a separate computer in communication with the CNC control.

The manufacturing arrangement also includes one or more inspection stations, each comprising an inspection machine, preferably a CNC gauging machine 20, 22, 24 for inspecting parts (workpieces) produced by the production machines. A suitable flexible comparative gauging machine is sold by the present applicants Renishaw plc under the trade mark EQUATOR. As described in our earlier international patent application no. WO 2013/021157, which is incorporated herein by reference, this gauging machine has a motorised structure with a non-Cartesian geometry. This moves a probe in three dimensions relative to a production workpiece, in order to compare the production workpiece to a master reference workpiece. Each gauging machine is controlled by a respective computer or controller 21, 23, 25, which also acquires measurements from the machine. Optionally, this computer or controller may also undertake processing of the measurement results, e.g. to determine whether a workpiece dimension is within tolerance.

Instead of these gauging machines, the inspection stations could comprise other dimensional measuring equipment, such as computer-controlled coordinate measuring machines (CMMs) or inspection robots. Alternatively, they may comprise gauging fixtures or jigs, in which gauges with LVDT or other transducers are custom-designed to measure specific dimensions of the workpieces. The measurement results of these gauges may be fed automatically or manually into the respective computer or controller 21, 23, 25. It is also possible to have inspection stations in which workpieces are measured manually using conventional hand-held gauges such as height gauges or calipers. Where computer motion control is not required, the computers or controllers 21, 23, 25 may be replaced by one or more terminals of a common server 28 (discussed below). The measurement results are then fed manually into the server via the terminal or terminals.

The manufacturing arrangement further includes a transport system 26, for transferring parts (workpieces) from any of the machine tools 10, 12, 14, 16 to any of the gauging machines 20, 22, 24. Here they can be inspected for conformance to specified dimensional tolerances. The transport system could comprise computer-controlled robots, vehicles or conveyors, or could simply involve the manual transfer of workpieces or pallets of workpieces. It may be part of a larger transport system which also supplies raw billets or castings for machining to the machine tools, and/or removes workpieces after manufacture or after inspection. If necessary, it may return a workpiece to a machine tool for re-work after inspection.

A server 28 is also provided. A program or software module in this server 28 is responsible for scheduling the production of workpieces, and is connected to the CNC controllers of the machine tools and gauging machines by one or more data buses 30. The server 28 also controls the transport system 26, e.g. for transferring workpieces between the machine tools and the gauging machines when required. For example, the server 28 may take the form of a programmable logic controller, as used conventionally to control a production cell with multiple machine tools, but with different programming as described below.

The server 28 may provide the machine tools and gauging machines with the necessary CNC part programs for machining and inspecting each particular design of part (workpiece) to be produced, as they are required. Alternatively, these part programs may be stored in the controllers of the machine tools and gauging machines, and selected for use on the basis of instructions received from the server 28.

Typically, the server 28 may schedule that a series of nominally identical parts (workpieces) of a particular design are to be produced on the machine tools 10, 12, 14, 16. It may then instruct that each of these workpieces is to be transferred to one of the gauging machines (e.g. the gauging machine 20) and schedule its inspection on that machine. Or it could schedule that a regular sample of the workpieces is inspected (e.g. that every 10th workpiece is inspected; or that a workpiece is inspected after a given time period has elapsed, such as one workpiece per hour).

Inspection of each workpiece at the inspection station 20, 22, 24 produces multiple dimensional measurements which are passed back to the server 28 on the bus 30 and stored. If the measurements are processed by the computer or controller 21, 23, 25 of the inspection station, e.g. to determine whether the workpiece dimensions are within tolerance, then that result is also passed back to the server 28. If a workpiece is determined to be out of tolerance, either by the server 28 or by the computer or controller 21, 23, 25 of the inspection station, then the server may schedule it for rejection or re-work as appropriate. Alternatively, the computer/controller 21, 23, 25 may directly instruct the transport system 26 to send it to a "pass" or "fail" bin or pallet.

The various functions of the server 28 may be shared between two or more servers, as described in our unpublished co-pending UK Patent Application No. GB 1708730.5. The server or servers may also perform other process control and quality control functions, as described in that application. In a simpler system, the production scheduling, the usage of the various machines and the transfer of workpieces between machines may be all be decided and performed by human operators instead.

Figure 2:
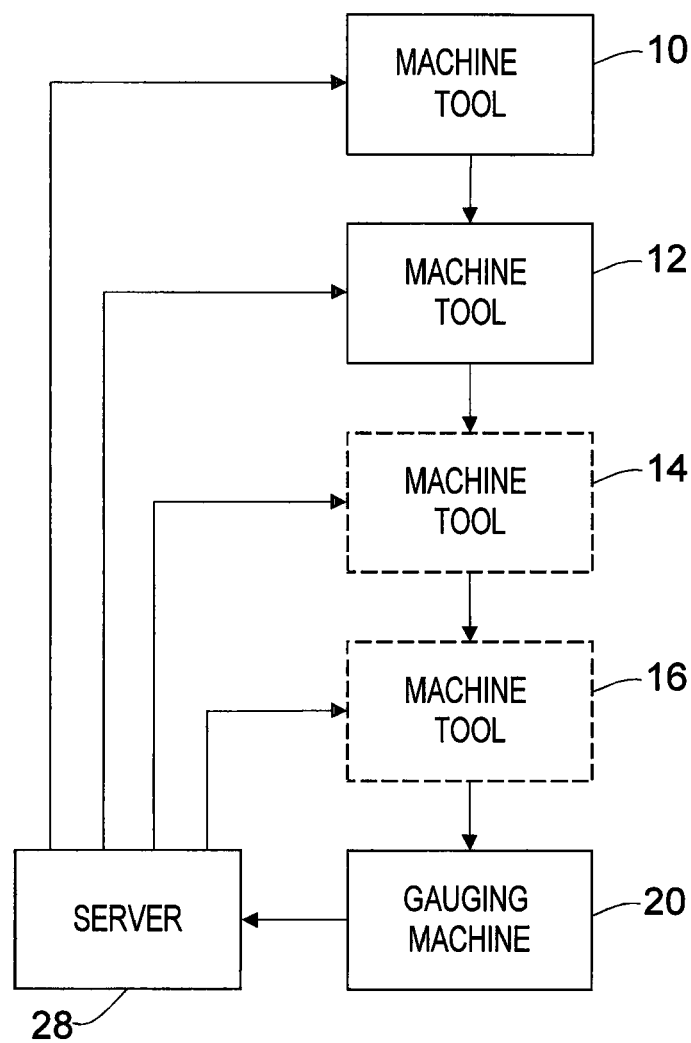
FIG. 2 is a workflow diagram for a method according to a preferred embodiment of the invention.
Figure 3:
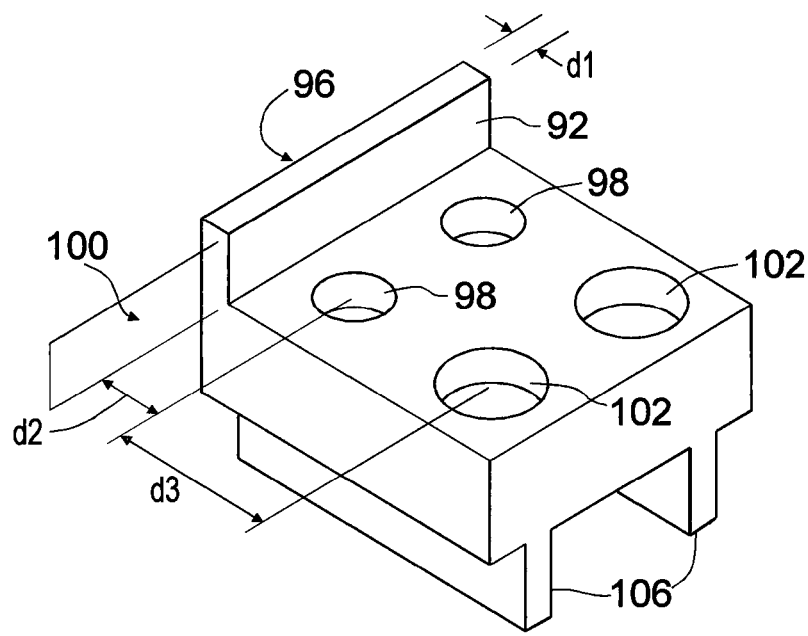
FIG. 3 shows an example of a workpiece which can be manufactured using the method.

FIG. 2 shows the workflow in a preferred method of the invention, producing a series of nominally identical workpieces 90 each of which may for example have features as shown in FIG. 3.

In this example, a first machine tool 10 machines a first feature of the workpiece, in the form of a shoulder 92. The machine tool 10 may be programmed to position the shoulder 92 at a distance d1 in relation to a first datum plane 96 on the rear of the workpiece, in accordance with a design document of the workpiece. The design document may be a drawing or a design file from a computer-aided-design (CAD) system. The datum plane 96 may be defined by an original surface of the workpiece prior to machining, or by an abutting surface of a fixture to which it is mounted.

Next, the transport system 26 passes the workpiece to a second machine tool 12, which is programmed to machine further features of the workpiece, such as two holes 98. The design document may specify that the centrelines of these holes should be spaced by a distance d2 from a second datum plane 100 defined by the shoulder 92.

FIG. 3 shows examples of further features which may respectively be machined by successive machine tools 14, 16, programmed in accordance with the workpiece design document. The machine tool 14 may machine further holes 102, which may be of a different size to the holes 98. The design document may specify that they are spaced from the holes 98 by a distance d3. The machine tool 16 may machine further features such as spaced flanges 106 on underside of the workpiece.

While some of these features could be machined on the same machine tool as each other, it can be advantageous to machine them on separate machine tools in order to balance the workload amongst all the available machines in the factory. For example, since the different sizes of the holes 98 and 102 necessitate different cutters, it may be more efficient to machine them on separate machines. Also, it may not be possible to produce the flanges 106 on the underside without changing the setup of the workpiece, which may be most efficiently achieved by transferring it to another machine.

After all the machining processes have been completed, the transport system 26 then passes some or all of the finished workpieces to a common gauging machine 20 for inspection, as instructed by the server 28. The server may schedule that all workpieces are to be inspected, or just a sample of them (say one in ten workpieces). The sampling frequency may be pre-programmed or determined by the server in accordance with a programmed algorithm. For example, the sampling frequency may be increased if significant variance is found in the inspection results, or conversely decreased if there is no significant variance.

The gauging machine 20 is programmed to measure each of the dimensions d1, d2, d3, together with any other dimensions specified by the design document, such as the diameters of some or all of the holes 98, 102 and the widths and spacing of the flanges 106. Depending on the need for efficient scheduling of the use of the machines in the factory, one of the other gauging machines 22, 24 may instead be the common gauging machine to which the workpiece is passed after all the machining processes. That is, one gauging machine 20 measures all desired features of a given workpiece 90 in common, but other workpieces 90 of the series may be measured on other gauging machines 22 or 24.

All the measured dimensions are passed to the server 28. The server compares the measured dimensions with the design values from the design document, if that has not already been done in the computer or controller 21 as discussed above. As an alternative to a pass/fail/rework decision by the computer/controller 21, the server 28 may determine if one or more of the measured dimensions or coordinate positions (such as the diameter of one of the holes 98, 102 or the position at which a feature has been machined) differs from the design value by more than a predetermined tolerance specified in the design document. If so, it schedules that workpiece for rework or rejection (scrapping).

If there is a difference from the design value, the server 28 also calculates an offset value and feeds it back to the controller of the machine tool which produced the measured feature concerned, to adjust the machining process for subsequent workpieces. This may update a tool offset table or correct the workpiece coordinate system in the controller of the machine tool. This ensures that subsequent workpieces in the series are produced within tolerance. The server may also determine if the measured dimension is merely approaching the design value without exceeding it, for example by comparing the measured dimension with a control limit set in the design document. In this case, rejection or re-work are not required, but the server likewise calculates an offset value and feeds it back to the controller of the machine tool which produced the feature concerned. Again, this adjusts the machining process so as to ensure that subsequent workpieces continue to be produced within tolerance.

Figure 4:
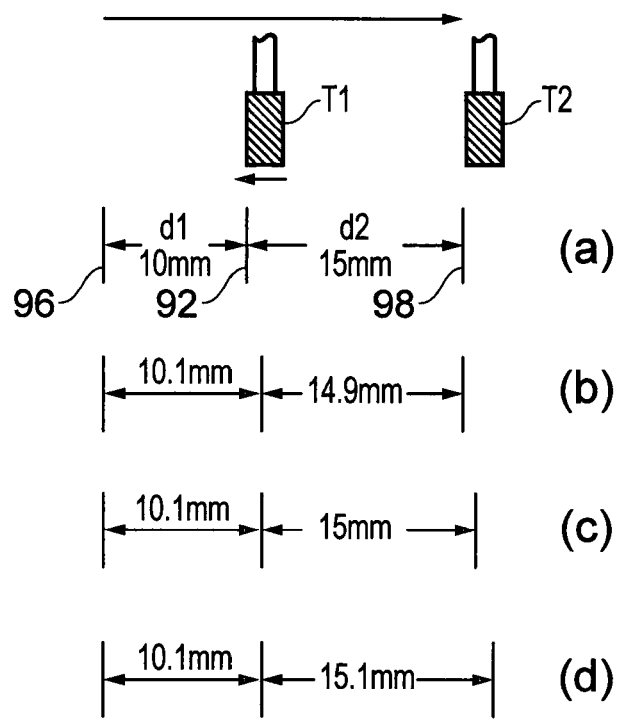
FIG. 4 is a schematic illustration of updating tool offsets in the manufacture of the workpiece of FIG. 3.

Thus for example, in the case of the measurement of the position of the shoulder 92 relative to the datum plane 96 (dimension d1), if necessary the server feeds back an offset value to update the positioning of the relevant cutting tool T1 in the machine tool 10 for subsequent workpieces, as illustrated in FIG. 4. If the correct design value of the dimension d1 is 10 mm as shown at (a) in FIG. 4, but the measurement on the gauging machine 20 shows it to be 10.1 mm as shown at (b), then a cutter offset for the diameter of the cutting tool T1 may be increased by 0.1 mm. Alternatively, if the datum plane 96 defines the origin of the workpiece coordinate system, then either a position offset of the tool T1 in that coordinate system is decreased by 0.1 mm, or the origin of the workpiece coordinate system itself may be corrected.

In the case of the measurement of the position of the centrelines of the holes 98 relative to the datum plane 100 (dimension d2), if necessary the server feeds back an offset value to update the positioning of the relevant cutting tool T2 in the machine tool 12. However, in this case, the server takes into account any offset already fed back to the machine 10 to correct the position of the shoulder 92. When subsequent workpieces are machined, the same offset will also affect the position of the holes 98.

FIG. 4 illustrates a case where the design value of the dimension d2 is 15 mm. In FIG. 4(*b*) the measurement of d2 shows it to be undersize, e.g. 14.9 mm rather than 15 mm. However, after the offset of the tool T1 in the machine tool 10 has been corrected by 0.1 mm, no further adjustment of the offset of the tool T2 in the machine tool 12 is required, relative to the datum plane 96 or the workpiece coordinate system. The update of the offset of the tool T1 will automatically correct the measurement of dimension d2 in subsequent workpieces.

If the measurement of d2 shows it to be apparently correct at 15 mm as shown at (c), then the update of the offset of the tool T1 will render it incorrect in subsequent workpieces. The position of the centrelines of the holes 98 should therefore also be adjusted. This can be done by updating the position offset of the tool T2 by 0.1 mm relative to the datum plane 96 or workpiece coordinate system, in the opposite sense to the update of the tool T1.

If the measurement of d2 shows it to be oversize, e.g. 15.1 mm as shown at (d), then additional adjustment is needed relative to the datum plane 96 or workpiece coordinate system. This is to take account of the offset fed back for the tool T1 as well as to correct the oversize. The offset for the tool T2 in the machine tool 12 is updated accordingly.

Likewise, the dimension d3 (the position of the centrelines of the holes 102 relative to those of the holes 98) takes account of both the previous dimensions d1 and d2. The relevant offsets for the machine tool 14 are updated accordingly.

The server 28 may also feed back tool offset values to the controllers of the relevant machine tools 12, 14, 16 to correct the diameters of the holes 98, 102 and the widths and spacing of the flanges 106.

Figure 5:
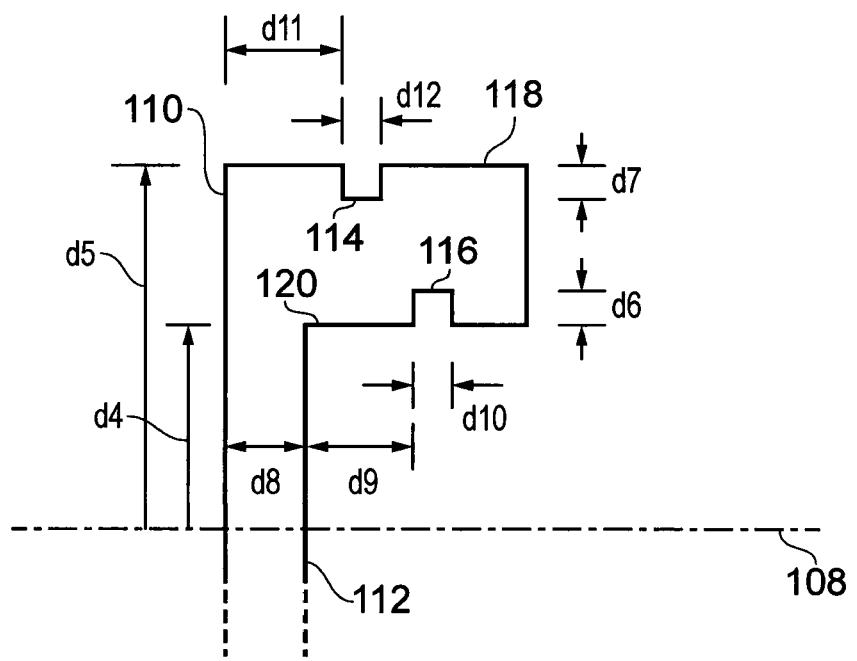
FIG. 5 shows an example of another workpiece which can be manufactured using the method.

Workpieces as shown in FIG. 3 are suitable for manufacture using machining centres or milling machines as the machine tools 10-16. FIG. 5 shows an alternative workpiece, of which some or all features may be machined using turning machines or lathes as the machine tools 10-16.

The workpiece of FIG. 5 has an end face 110 perpendicular to the centre line 108 of the turning machine or lathe, an inner face 112, and outer and inner turned surfaces 118, 120. An annular groove 116 (e.g. to receive an O-ring) is provided in the inner turned surface 120. A flat-bottomed slot 114 is machined in a part of the periphery of the outer turned surface 118.

As in FIG. 2, these various features may be machined on different machine tools 10-16, in order to balance the workload between the machine tools. In particular, the flat-bottomed slot 114 is most conveniently machined on a milling machine rather than on a turning machine or lathe.

After all the machining processes, dimensions d4-d10 are measured on the gauging machine 20, and offsets are fed back to update the appropriate tool offsets in the corresponding machine tools. This corrects the machining of subsequent workpieces, in a similar way as described with respect to FIGS. 3 and 4.

The end face 110 may for example be taken as a datum surface, and the offset for the tool which machines the inner face 112 may be updated based on the measured dimension d8.

The offsets for the tools which machine the sides of the annular groove 116 are then updated based on the measured dimensions d9 and d10, while taking account of any update based on the dimension d8, in the same way as described in FIG. 4. Similarly, the offset for the tool which machined one side of the slot 114 is updated while taking account of any update based on the position of the other side of the slot (dimension d11).

The dimensions d4 and d5 relate to the positions of the inner and outer turned surfaces 120, 118, relative to the centre line 108. The offsets for the tools producing the bottom surfaces of the groove 116 and slot 114 are updated based on the dimensions d6, d7, while taking account of the updates based on dimensions d4 and d5.

In any of the above examples, the server 28 is pre-programmed to configure which of the machine tools 10-16 the respective offset values are fed back to, depending on which machine tool machined the feature concerned. It is also pre-programmed as to which measured dimensions and which feature measurements to use when calculating the offset values, and which offsets should be updated on the machine tool concerned, depending on the measured dimension and which cutting tool on that machine was used. This is made possible because the measurements are performed together after the machining operations on different machine tools. This is even true in the case of the slot 114 which is produced not just on a different machine tool from the inner surface 120, but on a different type of machine tool.

When manufacturing the workpieces of FIG. 3, for example, a positioning offset may be fed back to the machine 12 relating to the measured dimension d2 and a cutting tool offset relating to the measured diameter of one of the holes 98. It may not be necessary to feed back a cutting tool offset for the diameter of the other hole 98, unless there is a gross error, e.g. caused by swarf or tool breakage. If both holes are machined by the same cutting tool it can normally be assumed that any required correction will be the same. Indeed, it may not even be necessary to measure the other hole 98.

Alternatively, rather than pre-programming the server 28, it is possible for the program to accept input from the machine tool operator to specify which offsets to update. For example, if the operator has specified which cutting tool should be used for a particular machining operation on a machine tool, then he/she may also specify that the corresponding offset value should be applied to that cutting tool.

In addition to feedback based on measuring a single workpiece, the server 28 also has a software module programmed to perform process control. It examines trends in the inspection measurement results from successive workpieces as they are inspected. It may for example determine a trend that a particular dimension is gradually increasing in size as successive workpieces are produced. That may be caused by wear of an associated cutting tool in the relevant machine tool 10-16, or by gradual thermal growth of the machine tool or of the raw material stock or billets or castings from which the workpieces are machined. The server 28 can then feed back an updated offset value for the corresponding cutting tool over the bus 30 to the CNC controller of the machine tool. This corrects the machining process to ensure that future workpieces in the series remain in tolerance.

Of course, if more convenient, this process control may be performed in a separate server which is in communication with the server 28.

In order to determine trends in the measurements, all the parts (workpieces) could be presented to the same gauging machine 20, in the same order that they are produced by the machine tools 10-16. However, to increase the flexibility of the overall production in the factory, it is possible to present them to different ones of the gauging machines 20-24. In this case, the parts may be labelled in the order of their production to aid in determining any trends, for example sorting the measurement results in the order of production by the machine tools 10-16. This may be as described in our co-pending UK Patent Application No. GB 1708730.5. The process control module may keep a historical record of the inspection results of all parts machined over a required period of time.

One suitable form of process control analyses the results from successive parts of the series in order, to produce an ordered history of the performance of the production machines 10-16 or of the relevant cutting tools or tool turrets of the production machines which machined the feature concerned. This is done according to pre-set rules which depend on the manufacturing process and the tolerance requirements of the parts concerned. Suitable rules are known to those skilled in this field. Some possible rules are illustrated graphically in FIG. 6.

Figure 6:
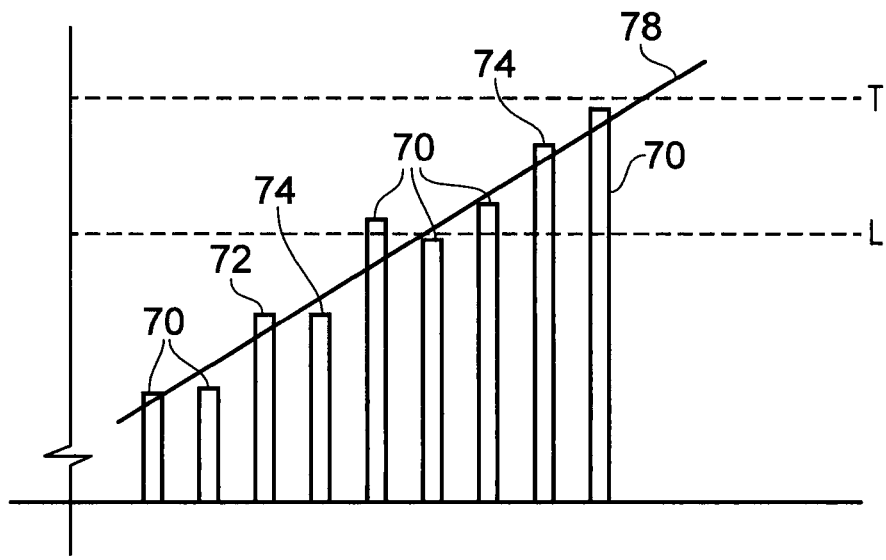
FIGS. 6 and 7 are graphs illustrating possible process control analyses which may be performed in preferred embodiments of the invention.

In FIG. 6, the broken line T denotes a maximum tolerance limit for the measured dimension or measured coordinate point concerned. The successive measurements exhibit a trend increasing towards the tolerance limit T. This may be a trend in the overall performance of the machine tool 10 or other production machine, or in the performance of a toolholding turret of the machine tool, e.g. caused by thermal drift. Or there may be a trend caused by gradual wear affecting the performance of an individual cutting tool used to machine the parts. The broken line L denotes a predetermined lower control limit, chosen to enable correction of the production process before the tolerance limit is exceeded, so that production of in-tolerance parts can continue uninterrupted.

One possible pre-set rule may simply assess whether the measured dimension or point coordinates have exceeded the control limit L. In FIG. 6 this is true of the fifth measurement bar. A more sophisticated rule analyses the successive measurement results statistically, e.g. using a least squares analysis. This may examine the results for a trend as indicated by the line 78. The rule may be triggered when such a trend is detected, according to suitably chosen criteria such as detecting when the slope of the line 78 exceeds a predetermined value. Or another possibility is that the rule may assess whether and when the trend will exceed the control limit L. In FIG. 6 this is true of the sixth measurement bar, but may be predicted from earlier measurements. Other possible rules may detect a decreasing trend in the measurements, or whether and when a decreasing trend (or an individual measurement) exceeds a predetermined control limit in a negative direction, before a minimum tolerance level is reached. Other possible rules filter the series of measurements to smooth the results or to remove outliers in the results which do not contribute to a general trend. This may be done before determining whether the filtered series of measurements exceeds the control limit or exhibits a trend.

If the rule has been triggered, then corrective action is required. For example, the server 28 may generate a control signal or value, such as calculating a new tool offset. The new tool offset could for example be a percentage of the error in the measured dimension, arranged in a sense to counter the detected trend. This is fed back to the controller of the corresponding one of the machine tools 10-16. In this case, the new tool offset adjusts the cutting tool of the machine tool 10-16 which is responsible for cutting the part feature of which the dimension has been analysed. In this way, the server 28 produces a control signal or value which is used to adjust the production process of the machine tool, to ensure that it continues to produce good parts within the tolerance limit T.

Other feedback actions are possible. For example, if the analysis shows that the tolerance limit T has been exceeded suddenly and unexpectedly, indicating that the cutting tool has broken, the corresponding machine tool 10-16 may be instructed to substitute a replacement cutting tool for future production. The server 28 then also schedules the out-of-tolerance workpiece to be rejected or re-worked. It is also possible that the process control module could just produce an alarm or send a message to request action by a human operator to investigate the problem with the machine tool.

It is also possible to perform a statistical analysis, giving statistical process control automatically in real time on the factory floor, rather than as a result of a subsequent analysis in a quality control room or laboratory. Such statistical process control may determine the process capability of the production machine or of a tool or tool turret of the machine, that is its capability to produce parts to a predetermined desired tolerance e.g. in terms of a known process capability index such as $C_{pk}$, $C_p$ or $P_{pk}$. This may simply be output as a management report, or it may be used to feed back to adjust the production process as described above. Or it is possible that the production machine may be fully capable of producing parts to the required tolerance, but offset from the nominal required dimensional values. In this case a correction is fed back to adjust the production machine to remove the offset.

FIG. 6 shows the measurement bars 70, 72, 74 placed simply in the order of production on the machine tools 10-16, so they are spaced equally. This may be appropriate, for example, if tool wear is anticipated and is to be monitored. It is instead possible to monitor trends etc while taking into account the actual recorded time of production and the time intervals between the times of production of each part on the machine tools 10-16. In this case, the spacing between the measurement bars will be uneven. This may be appropriate, for example, if changes caused by a gradual temperature drift are to be monitored.

Figure 7:
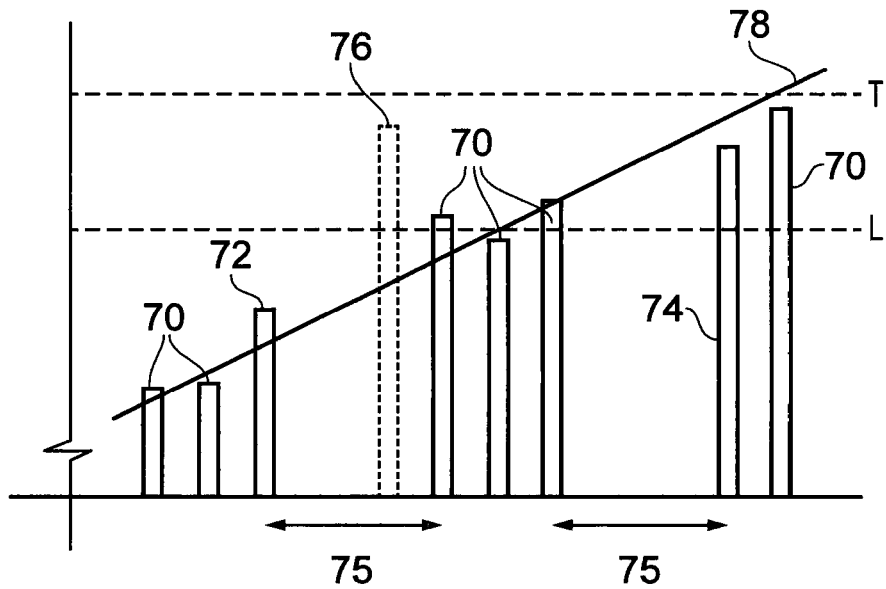

FIG. 7 illustrates a further example of uneven spacing of the measurement bars, with gaps 75 between measurements. One reason for the uneven spacing is that the process control module may include an initial step to detect outliers in the measurement results, such as an outlier 76, which is not taken into account. Other reasons for the gaps 75 are that the machine tools may have suffered some downtime, or parts may not be selected for inspection at a regular frequency. And/or some inspection results may be unavailable because one of the inspection stations is busy and they have been held up. Nevertheless, the analysis proceeds continually, detecting trends and performing other analysis rules based on the measurement results which are available. Of course, the spacings may also be uneven simply because they take account of the time intervals between the actual recorded times of production of the workpieces.

It will be recognised that FIGS. 6-7 relate to a set of measurement results for just one of the dimensions or points of the nominally identical workpieces. In practice, the dimensions or coordinate points of multiple features of the workpieces may be measured, giving multiple sets of such measurement results. Each set of measurement results may be assessed in the same manner, with feedback to the corresponding machine tool controllers as appropriate. However, it may not be necessary to provide feedback from all the sets of measurement results. For example, if the variability of the machine tool's production process arises from tool wear, this may be assessed and corrective feedback may be provided from just one of the sets of measurement results affected by the corresponding worn tool. If the variability arises from thermal growth, it may be possible to assess this and provide corrective feedback from only one or only a few of the sets of measurement results (corresponding to only one or only a few of the measured nominally identical features).

The invention claimed is:

1. A method of producing a workpiece, comprising:
   successively loading the workpiece onto two or more machine tools and performing one or more machining operations to produce one or more features of the workpiece on each machine tool;
   after the machining operations on both or all of the machine tools, passing the workpiece to a common dimensional inspection station;
   at the common dimensional inspection station, measuring dimensions of the features of the workpiece produced by the machining operations on the two or more machine tools;
   based on the results of measuring the dimensions of the features, producing two or more output signals which respectively relate to the performance of the two or more machine tools which performed the machining operations; and
   feeding each of the output signals back to the machine tool which performed the respective operation, to adjust the production process of each corresponding machine tool.

2. A method according to claim 1, including calculating a second one of the output signals in dependence on a first one of the output signals, prior to feeding the second output signal back to the corresponding machine tool.

3. A method according to claim 2, wherein the first output signal results from measuring a datum feature of the workpiece, and wherein the machine tool to which the second output signal is fed back performs an operation relative to that datum feature.

4. A method according to claim 1, wherein the workpiece is one of a plurality of nominally similar workpieces, on each of which the machining operations are successively performed using the two or more respective machine tools, and each of which is measured at a common inspection station, the method including analysing the results of the measurements of corresponding features of the workpieces and, based on the analysis, producing said output signals which respectively relate to the performance of the two or more machine tools and which are fed back thereto.

5. A method according to claim 4, wherein there are two or more dimensional inspection stations, and each workpiece is measured at one of the inspection stations.

6. A method according to claim 4, wherein the analysis of the results includes detecting a trend in the measurements of successive workpieces.

7. A method according to claim 1, wherein an output signal which is fed back to a machine tool updates a tool offset value.

8. A method according to claim 7, wherein the tool offset value to be updated has been pre-programmed to correspond to a cutting tool in the machine tool which performed the respective operation.

9. A method according to claim 1, wherein an output signal which is fed back to a machine tool updates a position at which a feature is machined and/or a workpiece coordinate system.

10. A manufacturing system comprising two or more machine tools, at least one dimensional inspection station, and a server and/or a controller or controllers, the server and/or the controller or controllers being configured to control the machine tools and inspection station to perform a method according to claim 1.

11. A software program which when run on a server and/or a controller or controllers of a manufacturing system causes the manufacturing system to perform a method according to claim 1.

* * * * *